(12) United States Patent
Schoonen

(10) Patent No.: US 6,978,822 B2
(45) Date of Patent: Dec. 27, 2005

(54) DEVICE FOR ROLLING UP/ROLLING DOWN A SHADE

(75) Inventor: Marinus Henricus Maria Schoonen, Dordrecht (NL)

(73) Assignee: N.V. Holding Nutsbedrijf Westland, Poeldijk (NL)

( * ) Notice: Subject to any disclaimer, the term of this patent is extended or adjusted under 35 U.S.C. 154(b) by 0 days.

(21) Appl. No.: 10/497,798

(22) PCT Filed: Dec. 5, 2002

(86) PCT No.: PCT/NL02/00792

§ 371 (c)(1),
(2), (4) Date: Jun. 7, 2004

(87) PCT Pub. No.: WO03/047335

PCT Pub. Date: Jun. 12, 2003

(65) Prior Publication Data
US 2005/0067119 A1  Mar. 31, 2005

(30) Foreign Application Priority Data
Dec. 5, 2001  (NL) .................................... 1019492

(51) Int. Cl.⁷ ............................................... E06B 9/70
(52) U.S. Cl. ...................... 160/310; 160/120; 160/243

(58) Field of Search ............................... 160/243, 310, 160/311, 241, 120, 312, 188, 242, 246, 122, 160/121.1

(56) References Cited

U.S. PATENT DOCUMENTS

| 3,693,695 | A | * | 9/1972 | Deane | ................. | 160/243 |
| 4,478,268 | A | * | 10/1984 | Palmer | ................. | 160/310 |
| 5,810,065 | A | | 9/1998 | Solari | | |
| 6,612,359 | B1 | * | 9/2003 | Moreau | ................. | 160/120 |
| 6,848,491 | B2 | * | 2/2005 | Gambarelli et al. | ........ | 160/122 |
| 6,860,310 | B2 | * | 3/2005 | Kubly et al. | ................. | 160/122 |

FOREIGN PATENT DOCUMENTS

| EP | 0 665 360 | 8/1995 |
| NL | 7 116 466 | 6/1973 |

* cited by examiner

Primary Examiner—David Purol
(74) Attorney, Agent, or Firm—Young & Thompson

(57) ABSTRACT

Assembly composed of a number of devices for rolling up/rolling down shading. On a side higher up, the said shading is immovably fastened to a frame and is wound onto or unwound from a tube from the bottom. Rotation of the tube is achieved by via a transmission device that can be slid along a vertical shaft. The vertical shaft is also the drive shaft. The transmission device is provided with clutches, so that on reaching the end positions when the drive shaft slips the transmission device can be brought to a standstill.

11 Claims, 3 Drawing Sheets

DEVICE FOR ROLLING UP/ROLLING DOWN A SHADE

The present invention relates to a device for rolling up/rolling down a shade, comprising a frame construction with an upper stationary fastening for said shade and a rotatable tube that is movable in said frame construction to and from said fastening, for the purpose of taking up/letting down shading, and a drive with drive motor for rotation of said tube, and guide means for moving said tube.

DESCRIPTION OF THE RELATED ART

Such a device is known from EP 066560A1. Shades are used in glasshouses and the like for screening against sunlight, for heat insulation, or for other purposes, immovably fastened, hanging vertically, to the frame construction of the glasshouse, and rolled up from the bottom by winding around a tube. In the prior art these tubes have a relatively large diameter, and one or more tube motors are fitted in them. Such tubes can have great lengths, ranging from tens of meters to over one hundred meters. Near the motors, the tubes are guided in a guide with provision for transmission of power for the tube motors. When the motors are operated, the tubes move up and down relative to the guides.

It has been found that the tube motors have a relatively very limited service life, owing to their complex construction. There is certainly no question of durability and reliability in the present system, and repairs and failure to function properly not only cause irritation, but also involve high costs. Furthermore, the power supply cables moving along at the same time are susceptible to damage. Moreover, it is generally not possible to cover the wall of a glasshouse with a single screen, since horizontal trusses (girders) are present near the wall of the glasshouse, and because every effort is being made to utilize as much of the surface area of the glasshouse as possible, it is not permitted to fit the screen at some distance from the outside of the wall. Screens are consequently always fitted between the horizontal trusses in the wall of a glasshouse. Several of such screens with at least the same number of tube motors can be fitted above one another over the height of a wall or roof. It will be understood that the replacement costs are extremely high. Moreover, the control of such tube motors is complicated, since the path that each tube motor has to travel in order to roll up or roll down the screen fully will not be constant in all circumstances. Complex regulating mechanisms are therefore necessary. This applies in particular if different screens are fitted above one another and the height of the screens to be rolled up/rolled down varies. This situation can arise, for example, if the distance between the horizontal trusses in a glasshouse is not constant. In view of the effect of the screen on the development of the plants and the prevention of energy losses, it is important for full closing or opening to be guaranteed.

SUMMARY OF THE INVENTION

It is the object of the present invention to avoid the above-mentioned disadvantages and to provide a roll-up system for shading that functions reliably, by means of which the beginning and end position can be controlled accurately, and which can be effective without malfunctioning for a long time, i.e. for many years.

This object is with the device described above in that said drive motor is rigidly connected to said frame, a drive shaft that can be rotated by said drive motor is present between said drive motor and said tube, and that a transmission device connected to said tube, movable on said frame in the direction of its axis and not rotatable relative to said drive shaft, is present, in order to transmit the rotary movement of said drive shaft to said tube.

According to the invention, use is no longer made of an expensive tube motor that is susceptible to damage and is difficult to install. A simple motor that is immovably connected to the frame is used. By means of transmission devices that may be present, a drive shaft, which will be fitted vertically in the case of vertically moving shading, is provided. The transmission device described above moves up or down in the vertical direction along this drive shaft. This vertical movement is imposed by the rolling up or rolling down of shading on the tube connected to the transmission device. The tube preferably extends in a direction perpendicular to the drive shaft.

By fitting in the transmission device a clutch that is effective when there is overloading, i.e. an adjustable clutch, it is possible during continuous rotation of the drive shaft to limit the maximum torque per transmission device (adjustable max. roll-up force) and also to make this limitation take effect by means of an adjustable stop (beginning/end). In both cases the clutch becomes active, with the result that moment-limited disconnection of the roller tube relative to the drive shaft occurs. Through use of a braking feature in the drive line in combination with the adjustable slip-action clutch, it is ensured that in the rolled-up position or in an intermediate position the roll-up tube does not roll out in an uncontrolled manner. Such a braking feature can be achieved with a worm wheel, for example, in the transmission device. However, it is also possible to provide a braking feature in the drive motor so that a relatively simple transmission in the transmission device is sufficient.

It is also possible to control such a clutch by electrical/electronic means and or to make it of an electromagnetic design. In other words, the end position can be determined electronically with sensors.

It is likewise possible to control everything electrically with the aid of external parameters. For example, it may be decided not to close, or only to close partially, one of three screens situated one above the other, while the others are in fact fully closed. It is likewise possible with the construction according to the present invention periodically to ensure that screens are fully closed by periodically moving the drive shaft, so that any screen that is not fully closed will now be fully closed. This also applies, of course, to opening.

If the output shaft of the transmission device is rigidly connected to the tube on which the shading is received, basically no guidance of the transmission device or support for taking of the torque is necessary. These forces can be received by the tube. Of course it is possible to independently guide the transmission in other cases along the frame of the green house or the like.

The device described above for rolling up and rolling down shades can also be used in the case of a so-called twin screen, i.e. a tube on which two shades are rolled on top of each other. One of these shades is connected in the manner described above to an immovable fastening situated above it, while the other shade has a weighted free end and extends hanging downwards.

The invention also relates to an assembly comprising a number of devices of the type described above, which devices are moved by means of a common drive shaft. With the invention it is possible to operate a number of devices, for example situated one above the other, by means of one drive shaft. With this invention it is also possible to operate simultaneously by means of one drive shaft several devices that are situated one above the other and differ in terms of height and/or required torque. These devices may be situated between horizontal trusses of, for example, a glasshouse. By means of the clutch described above and operating means to be fitted for it, such as stops, it is possible during rotation of the drive shaft to make each transmission device, and consequently each screen, perform exactly the right movement, without overloading occurring. This means that a large number of tubes on which shading is wound can be operated by means of a single motor.

Furthermore, at least one further drive shaft can be operated by means of the single motor.

It is possible to operate not only vertically moving screens, but also horizontally fitted screens in this way. In this case the tube on which the shade is wound is kept taut by means of counterweights or another (spring) mechanism. It is possible to operate simultaneously with one drive motor not only horizontal screens, but also vertical screens or screens placed at an angle.

BRIEF DESCRIPTION OF THE DRAWINGS

The invention will be explained in greater detail below with reference to exemplary embodiments illustrated in the drawing, in which.

DESCRIPTION OF THE PREFERRED EMBODIMENTS

Figure 1:
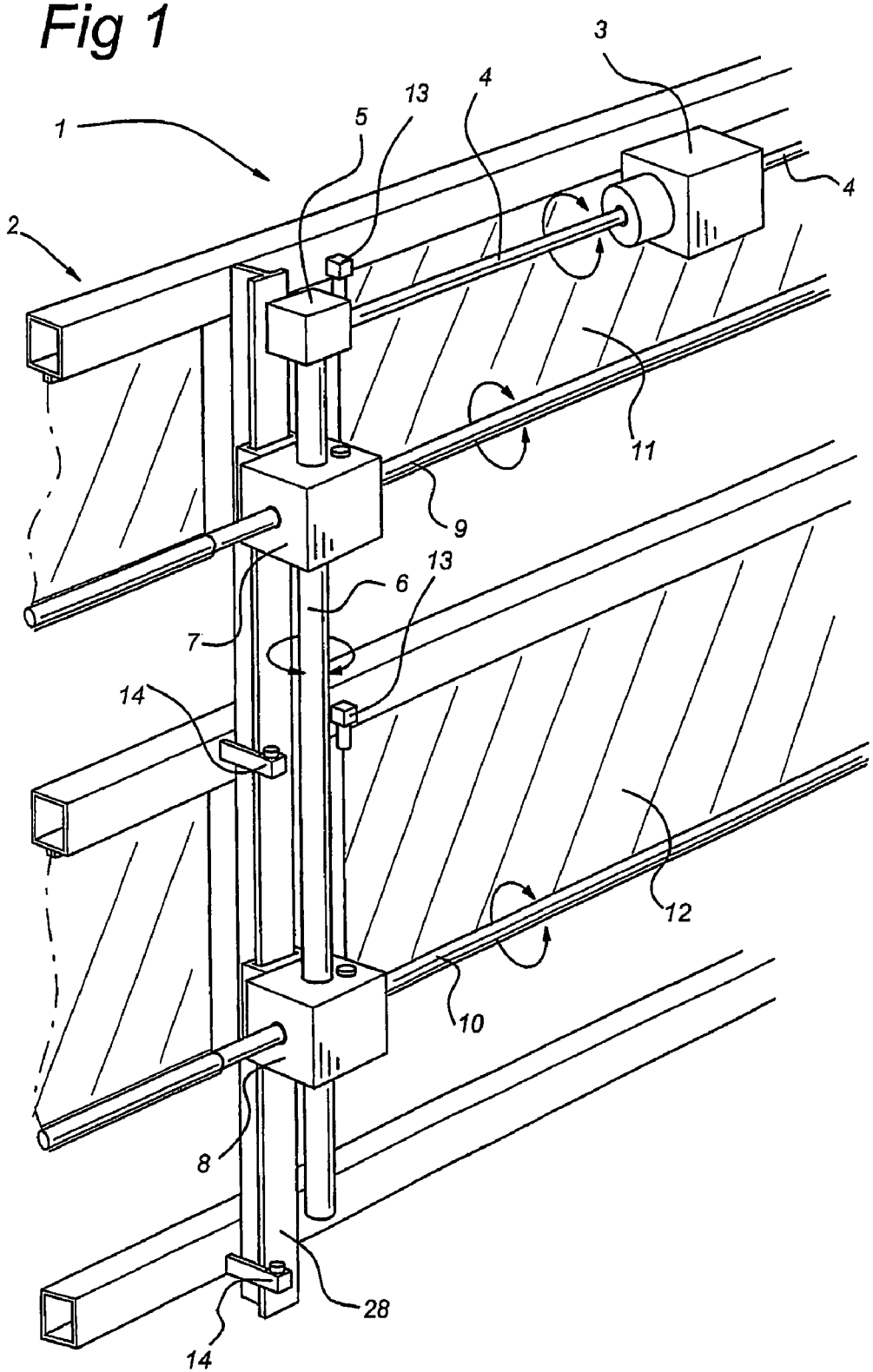
FIG. 1 shows diagrammatically in elevation a part of a glasshouse construction provided with the assembly according to the invention.
Figure 2:
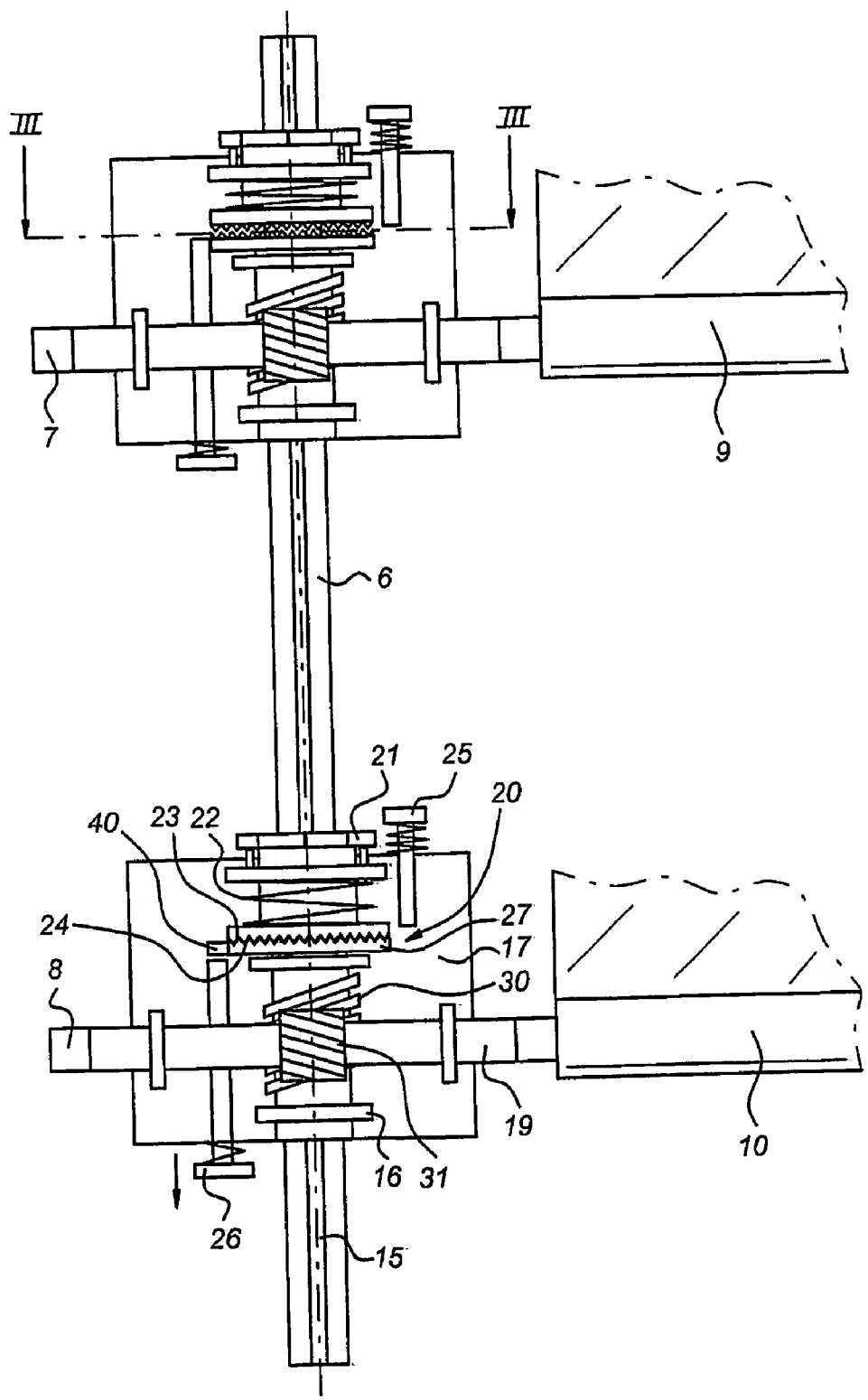
FIG. 2 shows a detail of the transmission device according to FIG. 1.

In FIG. 1 the assembly according to the present invention is indicated in its entirety by 1. The frame of the glasshouse is shown diagrammatically by 2. It is easily possible to use a separate frame for the construction according to the invention, but in the case of a glasshouse this was not found to be necessary. A motor 3 is immovably fastened to the frame construction 2. The auxiliary shaft 4 is present, and a substantially vertically extending drive shaft 6 is driven by way of a right-angled transmission 5. The drive shaft 6 extends through transmission devices 7 and 8 respectively, by means of which tubes 9 and 10 respectively are driven, for the purpose of moving screens 11 and 12 respectively. Stops 13 and 14, which can interact with the operating means 25 and 26 respectively shown in FIG. 2, are present. The abovementioned screens 11 and 12 are illustrated in FIG. 1 by a solid line to the right of the vertical section 28. It will be understood that screens may also be present to the left of said section, as partially shown.

Figure 3:
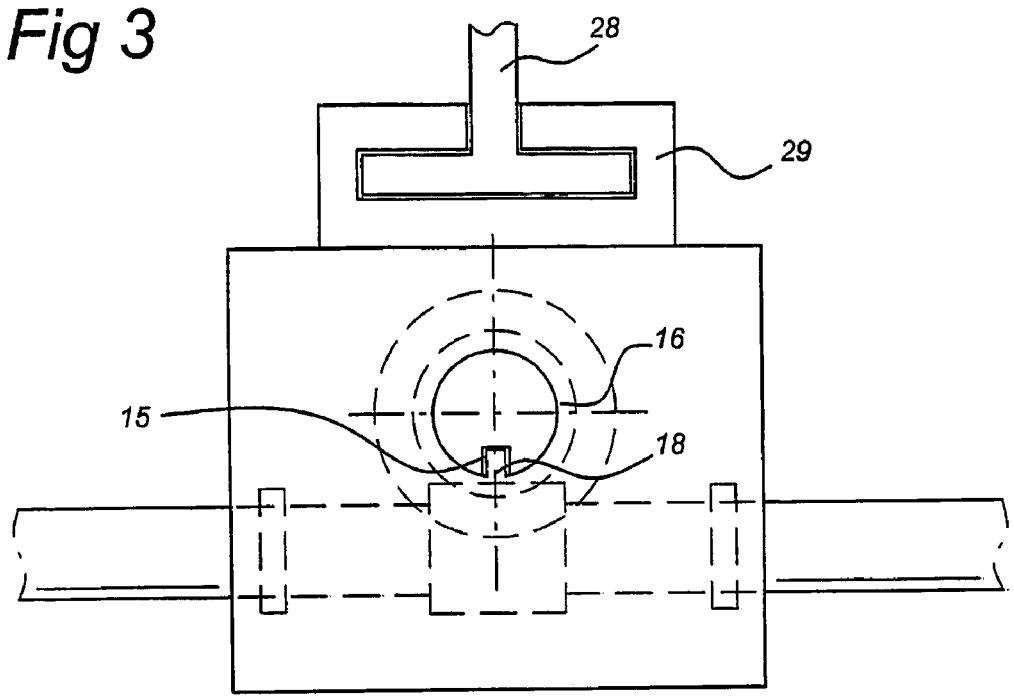
FIG. 3 shows a cross section along the line III—III in FIG. 2.

Details of the transmission devices 7 and 8 respectively are shown in FIGS. 2 and 3. It can be seen from these figures that shaft 6 is provided with a groove 15 extending along its entire length. The transmission device is composed of a box 17, which by way of a guide 29 (see FIG. 3) can be slid along its own drive (shaft 6) and the vertical T-section 28 of the frame construction 2. If the output shaft of the transmission device is rigidly connected to either tube 9 or 10, the guidance described above can be omitted. If the structure and more particular the shaft 6 is not positioned vertically, also at the lower end thereof a bearing should be provided to maintain the non vertical position. Inside box 17 is a self-braking gear transmission 30, 31, which drives shaft 19, which in turn is connected to tube 10 (or 9). This self braking property can alternatively be provided in the drive motor, a possible reduction thereof or the right-angled transmission 5. In the shown example a simple single gear transmission has been shown in box 17. However, it is possible to provide a multiple transmission obtaining a larger reduction. An example is a planet-sun wheel system. Furthermore it is possible to provide such a transmission that the tubes 9 and 10 are (in the horizontal plane) on a substantial distance from the vertical drive shaft 6. This makes it possible to provide the structure shown in the figures and more particular the tubes 9 and 10 and the related screen to be positioned between the horizontal trusses of the frame structure resulting in a surface saving.

In the shown example above a gear sleeve 16, a sleeve 21 is provided, which, as can be seen from FIG. 3, is provided with a key-shaped projection 18, which means that sleeve 21 is not rotatable, but is slidable, relative to drive shaft 6. Sleeve 21 is provided with a(n) (adjustable) slip-action clutch 23, fitted corresponding to tooth system 24 on gear sleeve 16. By means of spring 22, tooth system 23 is driven to tooth system 24, so that the rotary movement applied to sleeve 21 can be transmitted to gear sleeve 16. If, however, the load is too great, tooth systems 23 and 24 will move past each other and slip will occur. The moment of slip can be regulated by adjusting initial tension in the spring. It will be understood that slip or disconnection can be achieved in another way. The clutch formed in this way is indicated by 20. It will be understood that in stead of the clutch functioning on corresponding shape also simple clutches can be used only based on friction such as (wet) plate clutches.

Operating pins 25 and 26, which act upon lip 40 of pulley 27, are present.

During upwards or downwards movement, in the end position the pins 25 and 26 respectively are brought into contact with stops 13 and 14 respectively. Said stops consequently move inwards, and during the rotation of pulley 27 lip 40 will come into contact with the corresponding operating pin, with the result that slip occurs. When there is rotation in the other direction of the drive shaft, pulley 27 will be able to make a complete, or almost complete, revolution before lip 40 touches the corresponding pin, but owing to this complete, or almost complete, revolution being made, box 17 is moved so far from the corresponding stop that the corresponding operating pin is moved back again, with the result that the movement can be carried out. Also for operating of the clutch other mechanisms can be used, wherein the outwardly extending operating lever is operated by a stop provided on the frame and the clutch is released. I.e. structures wherein the clutch is actively disconnected and there is no condition of slip.

It can be seen from FIGS. 1–3 that, on rotation of the motor 3, drive shaft 6 is rotated. This causes the tubes 9, 10 to be rotated, so that the screen 11, 12 is wound up or wound down until stop 13 or 14 respectively is reached. At that moment the driving connection between drive shaft 6 and tube 9 and 10 respectively is broken. In other words, the end positions of tube 9 and 10 respectively are determined by the stops 13 and 14, and not by the ending of the rotation of the drive shaft 6. This makes it possible to connect a number of transmission devices one after the other on drive shaft 6. Furthermore, a safety mechanism is provided. In the event of overloading, the clutch 20 described above will also function, so that no damage is caused to the screens or drive. By means of the (adjustable) friction, the clutch 20 also prevents further rotation of tubes 9 and 10 if tube 6 is brought to a standstill in a position between the two end positions.

Figure 4:
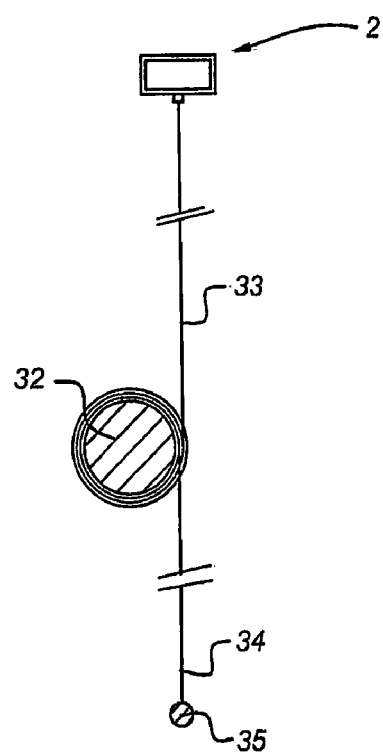
FIG. 4 shows a variant of the screen according to the invention illustrated diagrammatically.

A so-called twin screen is shown diagrammatically in FIG. 4. A central tube 32, on which a double shade is wound, is present. This is indicated by 33 and 34. Shade 33 extends upwards and is immovably fastened to the frame construction 2, like the screens 11 and 12. Shade 34 is provided with a weighted end, indicated by 35, which end is free, i.e. if desired moves upwards and downwards by way of a guide, by gravity. Tube 32 can be put in the place of tube 9 or 10. The same effect can be obtained in this way.

With the present invention it is possible, using a single motor, to operate various tubes for winding up and winding down a screen, while compensation can still be made for variations in height and/or tolerances. Furthermore, it is possible to connect different drive shafts to motor 2. Considerable savings can be obtained in this way, while the simple mechanical construction means that a longer service life than that in the case of tube motors is guaranteed. The variant described above, in the case of which the screens can be moved horizontally, can be produced in a particularly simple manner by suspension from the channels between the roof constructions of the glasshouses. It is also possible to connect at a curved roof construction, a number of shaft 6 through (cardanic) connections with each other and to displace a screen in between.

Although the invention has been described above with reference to a preferred embodiment, it will be understood by the person skilled in the art that it is possible to make numerous modifications, which spring to mind immediately after reading of the above, which are obvious to the person skilled in the art, and which lie within the scope of the appended claims. For instance, the drive shaft and/or the screens may be fitted in a non-vertical position, alternatives are available in the prior art for obtaining the same slip clutch effect, and numerous possibilities and alternatives are conceivable with regard to the use or otherwise and the design of the guide section 28.

What is claimed is:

1. A device for rolling a shade up and down, comprising:
   a frame construction with
   i) an upper stationary fastening connected to said shade and
   ii) a rotatable tube movable in said frame construction toward and away from said stationary fastening, movement of the tube rolling the shade up toward said stationary fastening and down away from said stationary fastening; and
   a drive comprising a drive motor for rotation of said tube, a drive shaft, a transmission device, and guide means for moving said tube,
   said drive motor being rigidly connected to said frame construction,
   said drive shaft rotatable by said drive motor and located between said drive motor and said tube, and
   the transmission device connected to said tube, movable on said drive shaft in the direction of its axis and non-rotatable with respect to said frame construction to transmit the rotary movement of said drive shaft to said tube.

2. The device according to claim 1, wherein,
   the axes of said drive shaft and said tube form an angle between 45 and 90°, and
   the movement of the tube rolling the shade up toward said stationary fastening and down away from said stationary fastening rolls the shade in one of a vertical, horizontal and oblique plane.

3. The device according to claim 1, wherein, said transmission device comprises a clutch.

4. The device according to claim 3, wherein, said clutch disconnects upon overload.

5. The device according to claim 3, wherein, said clutch is externally operable.

6. The device according to claim 1, wherein, said transmission device comprises a guide allowing the transmission device to move with respect to the frame.

7. The device according to claim 1, further comprising:
   another shade attached to said tube, said another shade having a free end located below said tube.

8. An assembly, comprising:
   plural devices for rolling a shade up and down,
   each of said devices comprising
   a frame construction with an upper stationary fastening for said shade and a rotatable tube that is movable in said frame construction toward and away from said stationary fastening for the purpose of rolling the shade up and down, and
   a drive comprising
   a drive motor for rotation of said tube, said drive motor being rigidly connected to said frame,
   guide means for moving said tube,
   a drive shaft rotatable by said drive motor and located between said drive motor and said tube, and
   a transmission device connected to said tube, movable on said drive shaft in the direction of its axis and non-rotatable with respect to said frame construction to transmit the rotary movement of said drive shaft to said tube; and
   a common drive shaft connecting said devices.

9. The assembly according to claim 8, further comprising an externally operable clutch and a clutch-operating means.

10. The assembly according to claim 8, wherein, each drive further comprises another drive shaft and said drive motor is connected to said drive shaft and to said another drive shaft.

11. A device for rolling a shade up and down, comprising:
    a shade;
    a frame comprising i) an upper stationary fastening element connected to said shade at a first edge and ii) a rotatable tube connected to said shade at a second edge, said tube movable toward and away from said stationary fastening element, movement of said tube rolling said shade up toward said stationary fastening element and down away from said stationary fastening element; and
    a drive connected to said tube and comprising i) a drive motor rigidly connected to said frame and connected to rotate said tube, ii) a drive shaft rotatable by said drive motor and located between said drive motor and said tube, iii) a transmission connected to said tube and movable on said drive shaft in the direction of its axis and non-rotatable with respect to said frame, the transmission connected to transmit the rotary movement of said drive shaft to said tube, and iv) guide means connected to guide movement of said tube with respect to said frame.

* * * * *